(12) United States Patent
Pope (10) Patent No.: US 6,218,774 B1
(45) Date of Patent: Apr. 17, 2001

(54) PHOTOLUMINESCENT/ ELECTROLUMINESCENT DISPLAY SCREEN

(76) Inventor: Edward J. A. Pope, 447 Lorenzo Dr., Agoura, CA (US) 91301

( * ) Notice: Subject to any disclaimer, the term of this patent is extended or adjusted under 35 U.S.C. 154(b) by 0 days.

(21) Appl. No.: 09/082,339

(22) Filed: May 20, 1998

Related U.S. Application Data (60) Continuation-in-part of application No. 08/560,380, filed on Nov. 17, 1995, now Pat. No. 5,757,124, which is a division of application No. 08/084,876, filed on Jun. 30, 1993, now Pat. No. 5,480,582.

(51) Int. Cl.[7] ............................................. H01J 29/10
(52) U.S. Cl. ........................ 313/461; 313/463; 313/465
(58) Field of Search .................................. 313/117, 461, 313/465, 495, 512, 463

(56) References Cited

U.S. PATENT DOCUMENTS 5,053,679 * 10/1991 Thioulouse ........................ 313/512

* cited by examiner

*Primary Examiner*—Nimeshkumar D. Patel
*Assistant Examiner*—Todd Reed Hopper
(74) *Attorney, Agent, or Firm*—W. Edward Johansen (57) ABSTRACT

A photo-luminescent/electro-luminescent display screen includes an electro-luminescent display, a photo-luminescent layer optically coupled to the electro-luminescent display. The photo-luminescent layer includes a transparent layer coated with an amorphous silica with fluorescence behavior. The screen further includes liquid crystal light valves which have a polarizer layer, a transparent glass substrate, a set of transparent electrodes which are formed by indium titanium oxide, a liquid crystal layer, a common transparent electrode formed by indium titanium oxide and a second polarizer layer.

11 Claims, 7 Drawing Sheets

OPTICALLY ACTIVE ORGANIC DYE MOLECULE

PORE DIAMETER (10mm)

FIG. 2

TABLE 1: EFFECT OF LIQUID ENVIRONMENT ON THE FLUORESCENCE BEHAVIOR OF OPTICALLY ACTIVE SILICA-GEL MICROSPHERES

| DOPANT IN MICROSPHERE | FLUORESCENCE PEAK WAVELENGTH (nm) | | |
|---|---|---|---|
| | RHODAMINE-6G | RHODAMINE-B | EUROPIUM 3+ |
| DYE IN EtOH SOL'N | 561 | 576 | N/A |
| DRIED MICROSPHERE | 586 | 642 | 615 |
| IMMERSED IN EtOH (30 MINUTES) | 579 | 628 | 615 |
| 24 HOURS) | 574 | 625 | 615 |
| IMMERSED IN HCL SOL'N (30 MINUTES) | 585 | 604 | 616 |
| (24 HOURS) | 580 | 603 | 616 |
| IMMERSED IN NH$_4$OH SOL'N (30 MINUTES) | 594 | 599* | 615 |
| (24 HOURS) | 589 | 596* | 616 |

\* SIGNIFICANT LEACHING OF DYE FROM MICROSPHERES OBSERVED.

PHOTOLUMINESCENT/ELECTROLUMINESCENT DISPLAY SCREEN

This is a continuation-in-part of an application filed Nov. 17, 1995 under Ser. No. 08/560,380, now U.S. Pat. No. 5,757,124 which is a divisional application of a patent application filed Jun. 30, 1993 under Ser. No. 08/084,876 now U.S. Pat. No. 5,480,582.

BACKGROUND OF THE INVENTION

The field of the invention is a photoluminescent/electroluminescent display screen which incorporates silica material with fluorescence behavior.

U.S. Pat. No. 4,983,369 a process for producing highly uniform microspheres of silica having an average diameter of 0.1–10 microns from the hydrolysis of a silica precursor, such as tetraalkoxysilanes, which is characterized by employing precursor solutions and feed rates which initially yield a two-phase reaction mixture.

U.S. Pat. No. 4,943,425 teaches a method of making high purity, dense silica of large particles size. Tetraethylorthosilicate is mixed with ethanol and is added to a dilute acid solution having a pH of about 2.25. The resulting solution is digested for about 5 hours, then 2N ammonium hydroxide is added to form a gel at a pH of 8.5. The gel is screened through an 18–20 mesh screen, vacuum baked, calcined in an oxygen atmosphere and finally heated to about 1200° C. in air to form a large particle size, high purity, dense silica.

U.S. Pat. No. 4,965,091 teaches a sol-gel procedure is described for making display devices with luminescent films. The procedure typically involves hydrolysis and polymerization of an organometallic compound together with selected luminescent ions, and coating of a substrate and then heat treatment to form a polycrystalline layer.

U.S. Pat. No. 4,931,312 teaches luminescent thin films which are produced by a sol-gel process in which a gellable liquid is applied to a substrate to form a thin film, gelled and heated to remove volatile constituents and form a polycrystalline luminescent material.

U.S. Pat. No. 4,997,286 teaches an apparatus for measuring temperature in a region of high temperature which includes a sensor made from a fluorescent material, located within the region of high temperature. The fluorescent decay time of the fluorescent material is dependent upon the temperature of the fluorescent material.

U.S. Pat. No. 4,948,214 teaches an array of individual light emitters of a LED linear array each of which is imaged by a discrete step-index light guide and gradient index microlens device. The light guides consist of high refractive index cores, each surrounded by low refractive index matter. A multiplicity of light guides are deposited in channels formed in a host material, such as a silicon wafer. The host material between adjacent channels functions as an opaque separator to prevent cross-talk between adjacent light guides.

U.S. Pat. No. 4,925,275 teaches a liquid crystal color display which provides a transmitted light output that is of one or more colors, black, and/or white, as a function of the color of the incident light input and controlled energization or not of respective optically serially positioned liquid crystal color layers and/or multicolor composite liquid crystal color layer(s) in the display. In one case the display includes a plurality of liquid crystal color layers, each being dyed a different respective color, and apparatus for selectively applying a prescribed input, such as an electric field, to a respective layer or layers or to a portion or portions thereof. Each liquid crystal layer includes plural volumes of operationally nematic liquid crystal material in a containment medium that tends to distort the natural liquid crystal structure in the absence of a prescribed input, such as an electric field, and pleochroic dye is included or mixed with the liquid crystal material in each layer. Each layer is differently colored by the dye so as to have a particular coloring effect on light incident thereon. Exemplary layer colors may be yellow, cyan and magenta.

U.S. Pat. No. 4,957,349 teaches an active matrix screen for the color display of television images or pictures, control system which utilizes the electrically controlled birefringence effect and includes an assembly having a nematic liquid crystal layer with a positive optical anisotropy between an active matrix having transparent control electrodes and a transparent counter electrode equipped with colored filters and two polarizing means, which are complimentary of one another and are located on either side of the assembly.

U.S. Pat. No. 4,948,843 teaches dye-containing polymers in which the dyes are organic in nature are incorporated into glasses produced by a sol-gel technique. The glasses may be inorganic or organic-modified metal oxide heteropolycondensates. The dye-containing polymers are covalently bonded to the glass through a linking group. These products can be used to make optically clear colored films which can be employed in the imaging, optical, solar heat energy and related arts.

U.S. Pat. No. 5,598,058 teaches a thick-film multi-color electroluminescent display which includes a transparent substrate, a transparent electrode deposited on the substrate, a phosphor layer deposited on the transparent electrode having two regions having different compositions providing visually distinct spectra of light when placed in a common electric field, a dielectric layer deposited on the phosphor layer, and a second electrode deposited on the dielectric layer. The phosphor layer may be composed of a marbled ink having a mixture of a first phosphor ink and a second phosphor ink having different compositions providing visually distinct spectra of light when placed in a common electric field. The phosphor layer may be composed of at least two halftone screen prints corresponding to at least two phosphor compositions providing visually distinct spectra of light when placed in a common electric field.

U.S. Pat. No. 5,602,445 teaches a bright, short wavelength blue-violet phosphor for electroluminescent displays which includes an alkaline-based halide as a host material and a rare earth as a dopant. The host alkaline chloride can be chosen from the group II alkaline elements, particularly strontium chloride ($SrCl_2$) or calcium chloride ($CaCl_2$), which, with a europium (Eu) or cerium (Ce) rare earth dopant, electroluminesces at a peak wavelength of 404 and 367 nanometers (nm) respectively. The resulting emissions have CIE chromaticity coordinates which lie at the boundary of the visible range for the human eye thereby allowing a greater range of colors for full color flat panel electroluminescent (FPEL) displays.

U.S. Pat. No. 5,719,467 teaches an organic electroluminescent device which has a conducting polymer layer beneath the hole transport layer. A conducting polymer layer of doped polyaniline (PANI) is spin-cast onto an indium-tin oxide (ITO) anode coating on a glass substrate. Then a hole transport layer, for example TPD or another aromatic tertiary amine, is vapor-deposited onto the conducting polymer layer, followed by an electron transport layer and a cathode.

Polyester may be blended into the PANI before spin-casting and then removed by a selective solvent after the spincasting, leaving a microporous layer of PANI on the anode. The conducting polymer layer may instead be made of a .pi.-conjugated oxidized polymer or of TPD dispersed in a polymer binder that is doped with an electron-withdrawing compound. An additional layer of copper-phthalocyanine, or of TPD in a polymer binder, may be disposed between the conducting polymer layer and the hole transport layer. The conducting polymer layer may serve as the anode, in which case the ITO is omitted.

U.S. Pat. No. 5,717,289 teaches a thin film electroluminescent element which has a color changing layer doped with green luminescent material and red fluorescent material and separated from an electroluminescent layer for generating blue light for converting the blue light to green light and the green light to red light, and the separation results in reduction of trapping center in the electroluminescent layer.

U.S. Pat. No. 5,711,898 teaches a blue-green emitting ZnS:Cu,Cl phosphor which is made by doping the phosphor with small amounts of gold and increasing the amount of low intensity milling between firing steps. The phosphor has better halflife and brightness characteristics while maintaining its desired emission color.

U.S. Pat. No. 5,705,888 teaches an electro-luminescent device which is composed of polymeric LEDs having an active layer of a conjugated polymer and a transparent polymeric electrode layer having electroconductive areas as electrodes. Like the active layer, the electrode layer can be manufactured in a simple manner by spin coating. The electrode layer is structured into conductive electrodes by exposure to UV light. The electrodes jointly form a matrix of LEDs for a display. When a flexible substrate is used, a very bendable EL device is obtained.

U.S. Pat. No. 5,705,285 teaches an organic electroluminescent display device which includes a plurality of pixels including a substrate upon which is disposed on a plurality of different light influencing elements. Deposited atop each light influencing element is an organic electroluminescent display element which is adapted to emit light of a preselected wavelength. A layer of an insulating, planarizing material may optionally be disposed between the light influencing elements and the OED. Each light influencing element generates a different effect in response to light of a preselected incident thereon. In this way, it is possible to achieve a red, green, blue organic electroluminescent display assembly using a single organic electroluminescent display device.

U.S. Pat. No. 5,705,284 teaches a thin film electroluminescence device which is characterized in that as a light emitting layer material or charge injection layer material, a polymer film having at least one of a light emitting layer function, a charge transport function and a charge injection function, and having a film thickness of not: more than 0.5 .mu.m is prepared by the vacuum evaporation method and used.

U.S. Pat. No. 5,703,436 teaches a multicolor organic light emitting device which employs vertically stacked layers of double heterostructure devices which are fabricated from organic compounds. The vertical stacked structure is formed on a glass base having a transparent coating of ITO or similar metal to provide a substrate. Deposited on the substrate is the vertical stacked arrangement of three double heterostructure devices, each fabricated from a suitable organic material. Stacking is implemented such that the double heterostructure with the longest wavelength is on the top of the stack. This constitutes the device emitting red light on the top with the device having the shortest wavelength, namely, the device emitting blue light, on the bottom of the stack. Located between the red and blue device structures is the green device structure. The devices are configured as stacked to provide a staircase profile whereby each device is separated from the other by a thin transparent conductive contact layer to enable light emanating from each of the devices to pass through the semitransparent contacts and through the lower device structures while further enabling each of the devices to receive a selective bias. The devices are substantially transparent when de-energized, making them useful for heads-up display applications.

U.S. Pat. No. 5,702,643 teaches a ZnS:Cu electroluminescent phosphor which has a halflife of at least about 900 hours. The halflife improvement is made by doping the phosphor with minor amounts of gold and substantially increasing the amount of low intensity milling between firing steps. The phosphor has a dramatically longer halflife without sacrificing brightness or exhibiting large shifts in emission color.

U.S. Pat. No. 5,700,592 teaches an electro-luminescent edge emitting device which has an improved operational life and electroluminescent efficiency includes a host material composed of at least two Group II elements and at least one element selected from Group VIA. The host material is doped with at least one of the rare earth elements in its 3+ or 2+ oxidation state. Two Group IIB elements may be selected, namely cadmium and zinc. Three Group IIA elements, magnesium, calcium and strontium, may bee selected as the host material. The Group VIA element is sulfide and/or selenide. The dopant is composed of one, two or three elements selected from the rare earth elements (lanthanides). The dopants may include Mn.sup.2+ and one or two of the lanthanides.

U.S. Pat. No. 5,700,591 teaches a phosphor thin film of a compound of zinc, cadmium, manganese or alkaline earth metals and an element of group VI which is sandwiched by barrier layers having a larger energy gap than that of the phosphor thin film, and a plurality of the sandwich structures are accumulated thicknesswise to constitute a light-emitting device. The phosphor thin film ensures the confinement of injected electrons and holes within the phosphor thin film. The light-emitting device has a high brightness and a high efficiency.

U.S. Pat. No. 5,693,962 teaches an organic full color light emitting diode array which includes a plurality of spaced apart, light transmissive electrodes formed on a substrate, a plurality of cavities defined on top of the electrodes and three electroluminescent media designed to emit three different hues deposited in the cavities. A plurality of spaced metallic electrodes arranged orthogonal to the transmissive electrodes and formed to seal each of the cavities, thereby, sealing the electroluminescent media in the cavities, with a light transmissive anodic electrode at the bottom of each cavity and an ambient stable cathodic metallic electrode on the top of each cavity.

U.S. Pat. No. 5,683,823 teaches an electro-uminescent device which includes an anode, a positive-hole transporting layer made of an organic compound, a fluorescent emitting layer made of an organic compound, a cathode. The fluorescent emitting layer includes a red light emitting material uniformly dispersed in a host emitting material. The host emitting material is adapted to emit in the blue green regions so that the light produced by this device is substantially white.

U.S. Pat. No. 5,677,594 teaches an electro-luminescent phosphor which is sandwiched by a pair of insulating layers which are sandwiched by a pair of electrode layers to provide an AC TFEL device. The phosphor consists of a host material and an activator dopant that is preferably a rare earth. The host material is an alkaline earth sulfide, an alkaline earth selenide or an alkaline earth sulfide selenide that includes a Group 3A metal selected from aluminum, gallium and indium. The phosphor is preferably fabricated by first depositing a layer of the alkaline earth sulfide, alkaline earth selenide or alkaline earth sulfide selenide including the rare earth dopant therein, depositing thereon an overlayer selected from an alkaline earth *thiogallate, an alkaline earth thioindate, an alkaline earth thioaluminate, an alkaline earth selenoaluminate, an alkaline earth selenoindate, or an alkaline earth selenogallate. The two layers are annealed at a temperature preferably between 750 and 850 degrees C.

U.S. Pat. No. 5,675,217 teaches a color EL device which includes a substrate, a first electrode formed on the substrate, a first insulating layer formed on the first electrode, a phosphorous layer formed on the first insulating layer and having inserted therein one or more intermediate insulating layers, a second insulating layer formed on the phosphorous layer and a second electrode formed on the second insulating layer.

U.S. Pat. No. 5,672,937 teaches flexible translucent electroconductive plastic film electrodes which are produced by perforating a normally nonconductive translucent plastic film, and then applying to both surfaces of the film thin layers of a conductive metal oxide such as indium-tin oxide. The conductive layers communicate through the perforations to form an electroconductive film electrode useful with an electroluminescent layer and a rear electrode to form lights, signs and similar electroluminescent laminates.

U.S. Pat. No. 5,670,839 teaches UV light of increased luminous intensity. Layered on one surface of a translucent substrate are a transparent electrode, a first insulating layer, an EL layer, a second insulating layer, and a metal electrode, in that order. A compound of the general formula: Zn.sub.(1−x) Mg.sub.x S is selected as a host material of the EL layer, and Gd or a Gd compound is selected as the luminescence center. The composition ratio x of the compound selected as a host material is selected to be within the range of 0.33.ltoreq.x<1, and preferably within the range of from 0.4–0.8, inclusive. This selection allows the band gap energy of the host material to be higher than the band gap energy of the luminescence center, thus preventing the absorption of the emitted light by the host material and providing UV light of increased luminous intensity.

U.S. Pat. No. 5,667,905 teaches an electro-luminescent material and solid state electro-luminescent device which includes a mixed material layer formed of a mixture of silicon and silicon oxide doped with rare earth ions so as to show intense room-temperature photo- and electroluminescence. The luminescence is due to internal transitions of the rare earth ions. The mixed material layer has an oxygen content ranging from 1 to 65 atomic % and is produced by vapor deposition and rare earth ions implant. A separated implant with elements of the V or III column of the periodic table of elements gives rise to a PN junction. The so obtained structure is then subjected to thermal treatment in the range 400.degree.–1100.degree. C.

U.S. Pat. No. 5,663,573 teaches light-emitting bipolar devices which consist of a light-emitter formed from an electroluminescent organic light-emitting material in contact with an insulating material. The light emitter is in contact with two electrodes that are maintained in spaced apart relation with each other. The light emitter can be formed as an integral mixture of light emitting materials and insulating materials or as separate layers of light-emitting and insulating materials. The devices operate with AC voltage of less than twenty-four volts and in some instances at less than five volts. Under AC driving, the devices produce modulated light output that can be frequency or amplitude modulated. Under DC driving, the devices operate in both forward and reverse bias.

U.S. Pat. No. 5,656,888 teaches a novel thin-film electroluminescent (TFEL) structure for emitting light in response to the application of an electric field which includes first and second electrode layers sandwiching a TFEL stack, the stack including first and second insulator layers and a phosphor layer that includes an alkaline earth thiogallate doped with oxygen.

U.S. Pat. No. 5,652,067 teaches an organic electroluminescent device which includes a substrate and formed thereon a multilayered structure successively having at least an anode layer, an organic electroluminescent layer and a cathode layer, a sealing layer having at least one compound selected from the group consisting of a metal oxide, a metal fluoride and a metal sulfide is further provided on the electrode layer formed later. A hole injecting and transporting layer is preferably provided between the anode layer and the organic electro-luminescent layer. An electron injecting and transporting layer may also be provided between the organic electroluminescent layer and the cathode layer. At least one layer of the hole injecting and transporting layer, organic electroluminescent layer and electron injecting and transporting layer may be formed of a polyphosphazene compound or a polyether compound or a polyphosphate compound having an aromatic tertiary amine group in its main chain.

U.S. Pat. No. 5,650,692 teaches an electro-luminescent device which includes a substrate and an electroluminescent stack which forms a step relative to the substrate. A transparent layer of protective material is placed atop the stack to bridge the step and create a smooth edge profile along the edge. A metallization layer is situated atop the layer of protective material and is coupled to the electroluminescent stack through vias in the protective material.

U.S. Pat. No. 5,648,181 teaches an inorganic thin film EL device which includes on an insulating substrate, a back electrode, an insulating layer, a light emission layer, an insulating layer, and a transparent electrode formed on the substrate in this order. The emission layer includes lanthanum fluoride and at least one member selected from the group consisting of rare earth element metals and compounds thereof. The rare earth element is, for example, cerium, praseodymium, neodium, samarium, europium, gadolinium, terbium, dysprosium, holmium, erbium, thulium, ytterbium and mixture thereof. The compounds maybe those compounds of the rare earth elements and fluorine, chlorine, bromine, iodine and oxygen. The rare earth element is preferably present in the emission layer in an amount of from 5 to 90 wt %.

U.S. Pat. No. 5,646,480 teaches an electro-luminescent display panel which has a plurality of parallel metal assist structures deposited on a glass substrate, a plurality of parallel transparent electrodes are deposited over and aligned with the metal assist structures such that each metal assist structure is surrounded by a transparent electrode. A conventional stack of dielectric and phosphor layers and a plurality of metal electrodes is deposited thereon to complete the electroluminescent display panel.

U.S. Pat. No. 5,645,948 teaches an organic EL device which includes an anode and a cathode, and at least one organic luminescent medium containing a compound of benzazoles of the formula: ##STR1## wherein: n is an integer of from 3 to 8; Z is O, NR or S; and R and R' are individually hydrogen; alkyl of from 1 to 24 carbon atoms, for example, propyl, t-butyl, heptyl, and the like; aryl or hetero-atom substituted aryl of from 5 to 20 carbon atoms for example, phenyl and naphthyl, furyl, thienyl, pyridyl, quinolinyl and other heterocyclic systems; or halo such as chloro, fluoro; or atoms necessary to complete a fused aromatic ring; B is a linkage unit consisting of alkyl, aryl, substituted alkyl, or subsituted aryl which conjugately or unconjugately connects the multiple benzazoles together.

U.S. Pat. No. 5,644,327 teaches an electro-luminescent display formed on a ceramic substrate which has a front ceramic surface and a back ceramic surface. The ceramic substrate includes a metal core that provides structural support, electrical ground, and heat dissipation. Electroluminescent cells are mounted on the front ceramic surface and driver circuits for driving the of electroluminescent cells are mounted on the back ceramic surface. The driver circuits are positioned directly behind the electroluminescent cells. Connectors extend through the ceramic substrate and the electroluminescent cells to different driver circuits. By positioning the driver circuits close to the EL cells, the drive lines from the drivers to the EL cells are short which allows for high refresh rates and low resistance losses. Each of the driver circuits can drive one electroluminescent cell or a group of electroluminescent cells. EL display cells coupled to a cermet electrode can also be driven by a field emission device or a low power electron beam.

U.S. Pat. No. 5,643,829 teaches a multilayer electroluminescence device which is formed by the steps of forming a lower electrode with a predetermined pattern on a substrate, forming a first insulation layer on the lower electrode atop the substrate; forming a multiply luminescent layer consisting of CaS and SrS on the first insulation layer at the same temperature with that for the first insulation layer; forming a second insulation film on the luminescent layer; and forming an upper electrode with a predetermined on the second insulation layer. In the multiply luminescent layer, a plurality of CaS plies and a plurality of SrS plies are formed in such a way that the CaS plies and the SrS plies alternate with each other and the outmost upper and lower plies are formed of CaS. The constituent substances for the multiply luminescent layer, CaS and SrS, can be deposited at the same temperature and have similar lattice constants which can lead to a matched interface between the CaS and SrS plies. By virtue of these advantages, stresses imposed on the interface, including thermal stress, can be significantly reduced. In addition, the matched interface makes electrons be accelerated with large energy, so that the fabricated multilayer luminescence device may show good quality.

U.S. Pat. No. 5,643,685 teaches an electro-luminescence element composed of a substrate, a first electrode, a first insulating layer, a light-emitting layer, a second insulating layer, and a second electrode in this order and a process for producing the same are disclosed, in which the light-emitting layer which includes a chemically stable oxide material containing a plurality of elements, the composition ratio of the elements constituting the oxide material being substantially equal to that of the elements charged, the light-emitting layer is formed by coating a first insulating layer with a sol solution containing a plurality of metal elements at a prescribed composition ratio and heating the coating layer to form an oxide layer.

U.S. Pat. No. 5,643,496 teaches an electro-luminescent phosphor composed of copper activated zinc sulfide having an average particle size less than 23 micrometers and a halflife equal to or greater than the halflife of a second phosphor having a similar composition and an average particle size of at least 25 micrometers.

U.S. Pat. No. 5,641,582 teaches a thin-film EL element which does not permit the color of the emitted light to change irrespective of a change in the voltage, which remains chemically stable and which emits light of high brightness even on a low voltage. The element includes two or more poly-crystalline thin light emitting layers and one or more thin insulating layers. The interface between a thin film and a thin film constituting a light emitting layer is formed by epitaxial growth, and the electrical characteristics of the element are equivalent to those of a single circuit which includes two Zener diodes connected in series, a capacitor connected in parallel with the serially connected Zener diodes, and a capacitor connected to one end of the capacitor.

U.S. Pat. No. 5,635,308 teaches phenyl-anthracene derivatives of the formula: A.sub.1—L—A.sub.2 wherein A.sub.1 and A.sub.2 each are a monophenylanthryl or diphenylanthryl group and L is a valence bond or a divalent linkage group, typically arylene are novel opto-electronic functional materials. They are used as an organic compound layer of organic EL device, especially a light emitting layer for blue light emission.

U.S. Pat. No. 5,635,307 teaches a thin-film EL element having as a laminated luminescent composite a configuration which includes at least a first layer and a second layer wherein the first layer includes a compound having a lattice constant, before lamination, larger than that of a compound constituting the second layer, and contains manganese as a luminescent center impurity, the difference between the lattice constant, before lamination, of the compound of the first layer and the compound constituting the second layer is 5% or more, and the peak value of the emission spectrum of the laminated luminescent composite rests on 590 nm or more, whereby the thin-film EL element can provide red light having high color purity.

U.S. Pat. No. 5,635,110 teaches a multi-stage process for preparing a phosphor product which includes the stages of selecting precursors of a dopant and a host lattice as the phosphor starting materials, grinding the starting materials in an initial grinding stage for an initial grinding time period to produce an initial ground material having a smaller particle size distribution than the starting materials, firing the initial ground material in an initial firing stage at an initial firing temperature for an initial firing time period to produce an initial fired material, grinding the initial fired material in an intermediate grinding stage for an intermediate grinding time period to produce an intermediate ground material having a smaller particle size than the initial fired material, wherein the intermediate grinding time period is substantially less than the initial grinding time period, firing the intermediate ground material in an intermediate firing stage at an intermediate firing temperature for an intermediate firing time to produce an intermediate fired material, wherein the intermediate firing temperature is substantially greater than the initial firing temperature, grinding the intermediate fired material in a final grinding stage for a final grinding time period to produce a final ground material having a smaller particle size than the intermediate fired material, and firing the final ground material in a final firing stage at a final firing temperature for a final firing time to produce a phosphor product, wherein the final firing time is substantially less than the intermediate firing time.

U.S. Pat. No. 5,625,255 teaches an inorganic thin film EL device which includes a substrate, a pair of electrode layers and a pair of insulating layers formed on the substrate in this order, and a light emission layer sandwiched between the paired insulating layers and arranged such that light emitted from the light emission layer is taken out from one side the light emission layer. The light emission layer is made of a composition which consists essentially of a fluoride of a metal of the group II of the Periodic Table and a member selected from the group consisting of rare earth elements and compounds thereof. The metal fluoride is of the formula, $M_{1-x} F_{2+y}$ or $M_{1+x} F_{2-y}$, wherein M represents a metal of the group II of the Periodic Table, x is a value ranging from 0.001 to 0.9 and y is a value ranging from 0.001 to 1.8. The device is useful as a flat light source.

U.S. Pat. No. 5,621,069 teaches a technique for the preparation of conjugated arylene and heteroarylene vinylene polymers by thermal conversion of a polymer precursor prepared by reacting an aromatic ring structure with an aqueous solution of an alkyl xanthic acid potassium salt. In this processing sequence the xanthate group acts as a leaving group and permits the formation of a prepolymer which is soluble in common organic solvents. Conversion of the prepolymer is effected at a temperature ranging from 150.degree.–250.degree. C. in the presence of forming gas. Studies have shown that electroluminescent devices prepared in accordance with the described technique evidence internal quantum efficiencies superior to those of the prior art due to the presence of pinhole free films and therefore permit the fabrication of larger area LED's than those prepared by conventional techniques.

U.S. Pat. No. 5,612,591 teaches an electro-luminescent device which includes the sequential lamination of a first electrode, first insulating layer, phosphor layer, second insulating layer and second electrode while using an optically transparent material at least on the side on which light leaves the device; wherein, in addition to the phosphor layer being composed of calcium thiogallate ($CaGa_2 S_4$) doped with a luminescent center element, the host of the phosphor layer is strongly oriented to the (400) surface.

U.S. Pat. No. 5,608,287 teaches an electro-luminescent device which has a bottom electrode layer disposed on a substrate for injecting electrons into an organic layer; and a top electrode, such as ITO, disposed on the organic layer for injecting holes into the organic layer. The bottom electrode is formed of either metal suicides, such as, rare earth suicides, or metal borides, such as lanthanum boride and chromium boride having a work function of 4.0 eV or less. The electrodes formed from either metal silicates, or metal borides provide protection from atmospheric corrosion.

U.S. Pat. No. 5,640,398 teaches an electro-luminescence light-emitting device for generating an optical wavelength which includes a substrate; an ITO layer coated on the substrate, at lest two light-emitting layers sequentially formed on the ITO layer and having a different band gap, and a metal electrode formed on an upper light-emitting layer of the at least two light-emitting layers. The ITO layer is used as an anode and the metal electrode is used as a cathode.

U.S. Pat. No. 5,598,059 teaches an AC thin film electroluminescent (TFEL) device which includes a multilayer phosphor for emitting white light having improved emission intensity in the blue region of the spectrum. The multilayer stack consists of an inverted structure thin film stack having a red light emitting manganese doped zinc sulfide (ZnS:Mn) layer disposed on a first insulating layer; a blue-green light emitting cerium doped strontium sulfide (SrS:Ce) layer disposed on the red light emitting layer; and a blue light emitting cerium activated thiogallate phosphor ($Sr_x Ca_{1-x} Ga_2 S_4$ :Ce) layer disposed on the blue-green light emitting layer. The manganese doped zinc sulfide layer acts as a nucleating layer that lowers the threshold voltage, and the cerium activated thiogallate phosphor layer provides a moisture barrier for the hydroscopic cerium doped strontium sulfide layer. The white light from the multilayer phosphor can be appropriately filtered to produce any desired color.

U.S. Pat. No. 5,593,782 teaches encapsulated electroluminescent phosphor particles which are encapsulated in a very thin oxide layer to protect them from aging due to moisture intrusion. The particles are encapsulated via a vapor phase hydrolysis reaction of oxide precursor materials at a temperature of between about 25.degree. C. and about 170.degree. C., preferably between about 100.degree. C. and about 150.degree. C. The resultant encapsulated particles exhibit a surprising combination of high initial luminescent brightness and high resistance to humidity-accelerated brightness decay.

U.S. Pat. No. 5,578,379 teaches siloxene and siloxene derivatives which are compatible with silicon and which may be generated as epitaxial layer on a silicon monocrystal. This permits the production of novel and advantageous electroluminescent devices, such as displays, image converters, optoelectric integrated circuits. Siloxene and siloxene derivatives may also be advantageously employed in lasers as laser-active material and in fluorescent lamps or tubes as luminescent material.

U.S. Pat. No. 5,574,332 teaches a low pressure mercury discharge lamp which includes a luminescent screen. The luminescent screen includes a zeolite containing trivalent Ce. The luminescent screen exhibits a large quantum efficiency for converting UV radiation of 254 nm into radiation having an emission maximum at approximately 346 nm.

U.S. Pat. No. 5,561,304 teaches an electro-luminescent silicon device includes a silicon structure which has a bulk silicon layer and a porous silicon layer. The porous layer has merged pores which define silicon quantum wires. The quantum wires have a surface passivation layer. The porous layer exhibits photoluminescence under ultra-violet irradiation. The porous layer is pervaded by a conductive material such as an electrolyte or a metal. The conductive material ensures that an electrically continuous current path extends through the porous layer; it does not degrade the quantum wire surface passivation sufficiently to render the quantum wires non-luminescent, and it injects minority carriers into the quantum wires. An electrode contacts the conductive material and the bulk silicon layer has an Ohmic contact. When biased the electrode is the anode and the silicon structure is the cathode. Electroluminescence is then observed in the visible region of the spectrum.

U.S. Pat. No. 5,554,911 teaches a multi-color light-emitting element which has at least two optical micro-cavity structures having respectively different optical lengths determining their emission wavelengths. Each micro-cavity structure contains a film of or organic material as a light-emitting region, which may be a single film of uniform thickness in the element.

U.S. Pat. No. 5,554,449 teaches a high luminance thin-film electroluminescent device which includes a phosphor layer having SrS as the host material and a luminous center. The phosphor layer is sandwiched between two insulating layers and two thin-film electrodes are provided on each side of the insulating layers. At least one of the electrodes is transparent, and the excitation spectrum of the phosphor layer exhibits a peak having a maximum value at a wavelength of about from 350 nm to 370 nm. Such a high luminance thin-film electroluminescent device can be prepared by annealing its phosphor layer having SrS as the host material at a temperature of at least 650 degree. C. for at least one hour in an atmosphere of a sulfur-containing gas.

U.S. Pat. No. 5,543,237 teaches an inorganic thin film EL device which includes, on an insulating substrate, a back electrode, an insulating layer, a light emission layer, an insulating layer and a transparent electrode formed on the substrate in this order. The emission layer includes a fluoride of an alkaline earth metal and at least one member selected from the group consisting of rare earth element metals and compounds thereof at a mixing ratio by weight of 10:90 to 95:5. The rare earth element is, for example, cerium, praseodymium, neodium, samarium, europium, gadolinium, terbium, dysprosium, holmium, erbium, thulium, ytterbium and mixture thereof. The compounds may be those compounds of the rare earth elements and fluorine, chlorine, bromine, iodine and oxygen.

U.S. Pat. No. 5,541,012 teaches a new infrared-to-visible up-conversion material which can be applied to an infrared light identification element having a useful conversion efficiency and sensitivity for infrared light in the wavelength of 1.5 .mu.m band, 0.98 .mu.m band and 0.8 .mu.m band without the necessity of previous excitation of the material. This infrared-to-visible up-conversion material consists of an inorganic material comprising at least two elements of erbium (Er) and a halogen or compounds thereof.

U.S. Pat. No. 5,540,999 teaches an electro-luminescent element which includes an organic compound layer formed of a thiophene polymer as a light emitting layer or a hole injection transport layer. The element emits light at high luminance and is reliable.

U.S. Pat. No. 5,536,588 teaches an amorphous organic thin-film element containing dye molecules with .SIGMA..DELTA.Str,m (J/(K.kmol))/Mw of 60 or less, assuming that the molecular weight is Mw and the sum total of an entropy change of melting and entropy changes of transition from a glass transition point to a melting point is .SIGMA..DELTA.Str,m (J/(K.kmol)), and having a high heat resistance and a high stability over long periods of time.

U.S. Pat. No. 5,529,853 teaches an organic EL element which includes a hole-injecting electrode and an electron-injecting electrode, and at least a film made of a luminous material therebetween, wherein the luminous material is one of a metal complex polymer, an inner complex salt having two or more ligands, and 10-hydroxybenzo [h] quinoline-metal complex.

U.S. Pat. No. 5,521,465 teaches an AC thin film electroluminescent display panel includes a metal assist structure formed on and in electrical contact over each transparent electrode, and light absorbing darkened rear electrodes which combine to provide a sunlight viewable display panel.

U.S. Pat. No. 5,517,080 teaches an AC thin film electroluminescent display panel includes a metal assist structure formed on and in electrical contact over each transparent electrode, and a graded layer of light absorbing dark material which combine to provide a sunlight viewable display panel.

U.S. Pat. No. 5,516,577 teaches an organic electroluminescence device which includes laminating layers in the order of anode/light emitting layer/adhesive layer/cathode, or anode/hole-injecting layer/light emitting layer/adhesive layer/cathode, the energy gap of the light emitting layer being larger than that of 8-hydroxyquinoline or metal complex thereof and contained in the adhesive layer, the light emitting layer comprising a compound which emits a blue, greenish blue or bluish green light in CIE chromaticity coordinates, and the adhesive layer including a metal complex of 8-hydroxyquinoline or a derivative thereof and at least one organic compound in an arbitrary region in the direction of the thickness of the layer, the thickness of which is smaller than that of the above-mentioned light emitting layer. According to the above organic electro-luminescence device, improvements in uniformity in light emission and emission efficiency are realized.

U.S. Pat. No. 5,508,585 teaches an EL lamp includes a transparent electrode, an electroluminescent dielectric layer overlying the transparent electrode, a patterned insulating layer overlies selected portions of the dielectric layer for reducing the electric field across the selected portions of the electroluminescent dielectric layer, and a rear electrode overlying the insulating layer and the electroluminescent dielectric layer. The insulating layer is preferably a low dielectric constant material and can overlie the electroluminescent dielectric layer or can be located between a separate dielectric layer and a phosphor layer. A gray scale is produced by depositing or printing more than one thickness of insulating layer.

U.S. Pat. No. 5,500,568 teaches an organic EL device having, as a cathode, a vapor deposited film containing at least one metal A selected from Pb, Sn and Bi and a metal B having a work function of 4.2 eV or less has high chemical stability of the cathode with time and high power conversion efficiency, and is useful as a display device and a light-emitting device.

U.S. Pat. No. 5,491,377 teaches a flexible, thick film, electroluminescent lamp in which a single non-hygroscopic binder is used for all layers (with the optional exception of the rear electrode) thereby reducing delamination as a result of temperature changes and the susceptibility to moisture. The binder includes a fluoropolymer resin, namely polyvinylidene fluoride, which has ultraviolet radiation absorbing characteristics. The use of a common binder for both phosphor and adjacent dielectric layers reduces lamp failure due to localized heating, thus increasing light output for a given voltage and excitation frequency, and increasing the ability of the lamp to withstand overvoltage conditions without failure. The lamps may be made by screen printing, by spraying, by roller coating or vacuum deposition, although screen printing is preferred. By the multilayer process, unique control of the illumination is achieved.

U.S. Pat. No. 5,487,953 teaches an organic electroluminescent device which includes an organic emitting layer and a hole transport layer laminated with each other and arranged between a cathode and an anode, in characterized in that the hole transport layer made of the triphenylbenzene derivative. This hole transport layer has the high heart-resistant property and high conductivity to improve the durability and thus this device emits light at a high luminance and a high efficiency upon application of a low voltage.

U.S. Pat. No. 5,484,922 teaches an organic electroluminescent device which employs, an aluminum chelate of the formula: wherein n is 1 and x is 1 or 2, or n is 2 and x is 1; and, Q is a substituted 8-quinolinolato group in which the 2-position substituent is selected from the group consisting of hydrocarbon groups containing from 1 to 10 carbon atoms, amino, aryloxy and alkoxy groups; L is a ligand, each L ligand being individually selected from (a) the group consisting of —R, —Ar, —OR, —ORAr, —OAr, —OC(O) R, —OC(O)Ar, —OP(O)R.sub.2, —OP(O)Ar.sub.2, —OS (O.sub.2)R, —OS(O.sub.2)Ar, —SAr, —SeAr, —TeAr, —OSiR.sub.3, —OSiAr.sub.3, —OB(OR).sub.2, —OB (OAr).sub.2, and —X, when x is 1, or from (b) —OC(O) Ar'C(O)O— or —OAr'O—, when x is 2, where R is a hydrocarbon group containing from 1 to 6 carbon atoms, Ar and Ar' are, respectively, monovalent and divalent aromatic groups containing up to 36 carbon atoms each, and X is a halogen; with the proviso that when L is a phenolic group n is 2 and x is 1.

U.S. Pat. No. 5,456,988 teaches an electro-luminescent device having a hole injection electrode, an electron injection electrode, and at least an organic emitting layer therebetween. The organic emitting layer includes an 8-quinolinol derivative-metal complex whose ligand is selected from the group consisting of chemical formulas 102 through 106: chemical formula 102 ##STR1## chemical formula 103 ##STR2## chemical formula 104 ##STR3## chemical formula 105 ##STR4## chemical formula 106 ##STR5##.

U.S. Pat. No. 5,453,661 teaches a flat panel display which includes a ferroelectric thin film between first and second spaced apart electrodes. The ferroelectric thin film emits electrons upon application of a predetermined voltage between the first and second spaced apart electrodes. The electrons are emitted in an electron emission path and impinge upon a luminescent layer such as a phosphor layer, which produces luminescence upon impingement upon the emitter electrodes. The ferroelectric thin film is preferably about 2 .mu.m or less in thickness and is preferably a polycrystalline ferroelectric thin film. More preferably, the thin ferroelectric film is a highly oriented, polycrystalline thin ferroelectric film. Most preferably, highly oriented ferroelectric thin film has a preferred (001) crystal orientation and is about 2 .mu.m or less in thickness. A flat panel display may be formed of arrays of such display elements. Top and bottom electrodes or side electrodes may be used. The display may be formed using conventional microelectronic fabrication steps.

U.S. Pat. No. 5,449,564 teaches an EL element which has at least one layer made from an organic material between an electron injection electrode and a hole injection electrode. The organic material consists of an oxadiazole series compound which has a plurality of oxadiazole rings. Each oxadiazole ring is substituted by a condensed polycyclic aromatic group.

U.S. Pat. No. 5,444,268 teaches a thin film EL device.

U.S. Pat. No. 5,443,922 teaches an organic thin film electroluminescence element.

U.S. Pat. No. 5,443,921 teaches a thin film electroluminescence device.

U.S. Pat. No. 5,442,254 teaches a fluorescent device with a quantum contained particle screen.

U.S. Pat. No. 5,432,014 teaches an organic electroluminescent element.

U.S. Pat. No. 5,429,884 teaches an organic electroluminescent element.

U.S. Pat. No. 5,405,710 teaches an article including microcavity light sources.

U.S. Pat. No. 5,404,075 teaches a TFEL element with a tantalum oxide and a tungsten oxide insulating layer.

U.S. Pat. No. 5,400,047 teaches a high brightness thin film electroluminescent display with low OHM electrodes.

U.S. Pat. No. 5,382,477 teaches an organic electroluminescent element.

U.S. Pat. No. 5,374,489 teaches an organic electroluminescent device.

U.S. Pat. No. 5,336,546 teaches an organic electroluminescence device U.S. Pat. No. 5,328,808 teaches an edge emission type electroluminescent device arrays U.S. Pat. No. 5,320,913 teaches conductive film and low reflection conductive film.

U.S. Pat. No. 5,319,282 teaches a planar fluorescent and electroluminescent lamp having one or more chambers.

U.S. Pat. No. 5,314,759 teaches a phosphor layer of an electroluminescent component.

U.S. Pat. No. 5,311,035 teaches a thin film electroluminescence element.

U.S. Pat. No. 5,309,071 teaches zinc sulfide electroluminescent phosphor particles and electro-luminescent lamp made therefrom.

U.S. Pat. No. 5,309,070 teaches an TFEL device having blue light emitting thiogallate phosphor.

U.S. Pat. No. 5,306,572 teaches EL element comprising organic thin film.

U.S. Pat. No. 5,300,858 teaches a transparent electroconductive film, an AC powder type EL panel and a liquid crystal display using the same.

U.S. Pat. No. 2,445,692 teaches an ultraviolet lamp. U.S. Pat. No. 2,295,626 teaches an ultraviolet lamp. U.S. Pat. No. 3,845,343 teaches a bulb for an ultraviolet lamp.

SUMMARY OF INVENTION

The present invention is directed to a display screen which includes an ultraviolet light source and a plurality of microspheres.

In a first aspect of the invention the display screen is a photoluminescent/electroluminescent display screen which includes a plate which has a plurality of holes arranged in a matrix array. Each microsphere has fluorescence behavior and is disposed in one of the holes in the plate.

In a second aspect of the invention the display screen is also includes a plurality of liquid crystal light valves. Each liquid crystal light valve is aligned with the holes of the plate and is optically coupled to one of the microspheres. The ultraviolet light source is optically coupled to the microspheres through the liquid crystal light valves.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE PREFERRED EMBODIMENT

Figure 1:
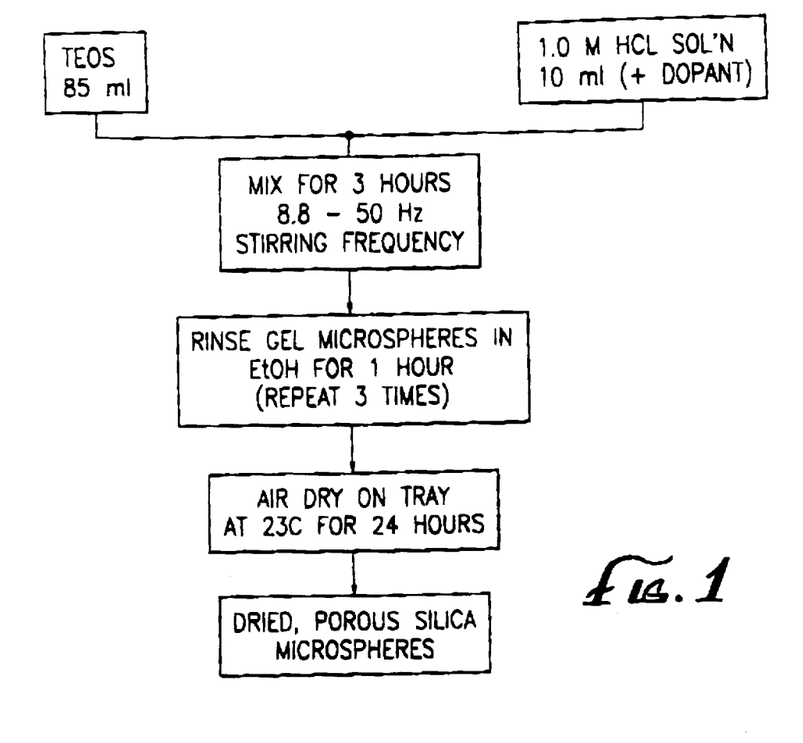
FIG. 1 is a schematic diagram of a process for synthesizing amorphous silica microspheres according to the present invention.
Figure 2:
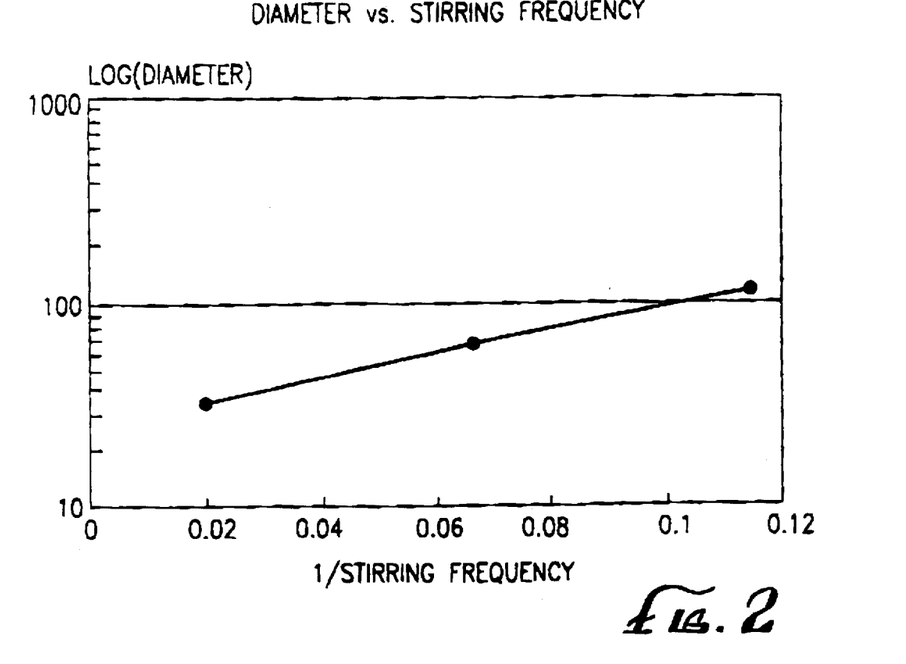
FIG. 2 is a graph of the diameter of the amorphous silica microspheres which have been synthesized by the process of FIG. 1.

Referring to FIG. 1 in conjunction with FIG. 2 a process for synthesizing amorphous silica microsphere with fluorescence behavior includes the steps of placing into a container an organosilicon precursor and a highly acidic solution, adding a dopant and stirring the organosilicon precursor and the highly acidic solution at a stirring rate sufficient to form droplets of the organosilicon precursor in the highly acidic solution. Water in the highly acidic solution hydrolizes the droplets of the organosilicon precursor to form amorphous silica microspheres 10. The stirring rate is in the range between 8 Hz to 50 Hz. The highly acidic solution has a molar concentration in the range of 0.05 to 2.5. The organosilicon precursor and the highly acidic solution are immiscible. The volumetric ratio of the organosilicon precursor to the highly acidic solution is in the range from 8 to 1 to 18 to 1. The organosilicon precursor is selected from a group consisting of tetraethoxysilane (TEOS), tetrabutoxysilane (TBOS), tetramethoxysilane (TMOS) and tetrapropoxysilane (TPOS). The highly acidic solution is selected from a group consisting of nitric acid ($HNO_3$) and hydrochloric acid (HCl). The dopant is selected from a group consisting of rhodamine-6G, rhodamine-B, europium $3^+$, fluorescein, coumarin-120, coumarin-314T, thionin, uranium and uranium-sensitized europium. The logarithium-plot of the average diameter of the amorphous silica microsphere 10 versus the inverse stirring frequency is linear.

Figure 3:
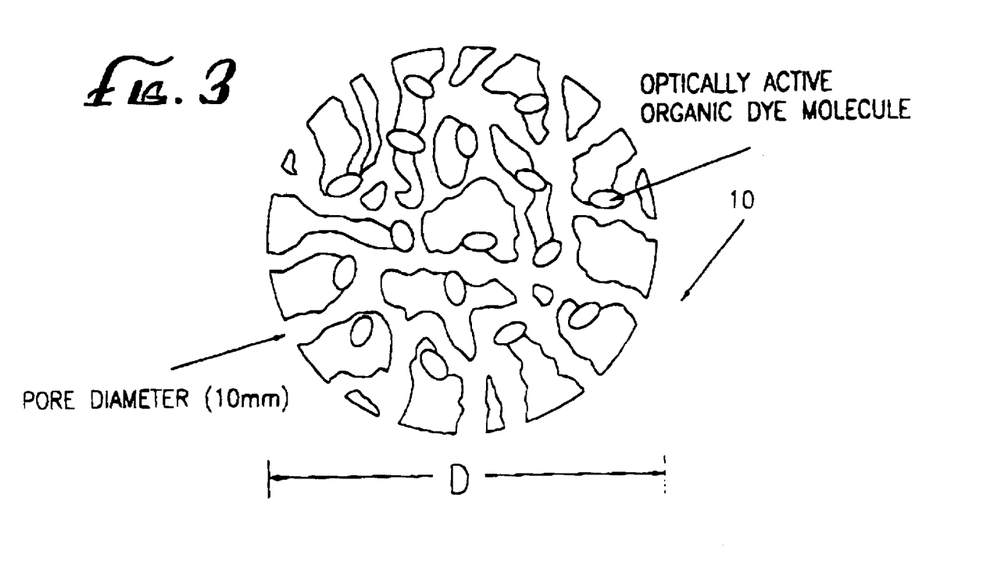
FIG. 3 is a cross-sectional of an amorphous silica microsphere which has been synthesized by the process of FIG. 1.

Referring to FIG. 1 in conjunction with FIG. 3 the process for synthesizing amorphous silica microsphere 10 with fluorescence behavior also includes the steps of rinsing with a solvent to remove excess of the organosilicon precursor from the amorphous silica microspheres and air drying the rinsed amorphous silica microspheres. The solvent may be, but is not limited to, either ethanol or methanol.

Figure 4:
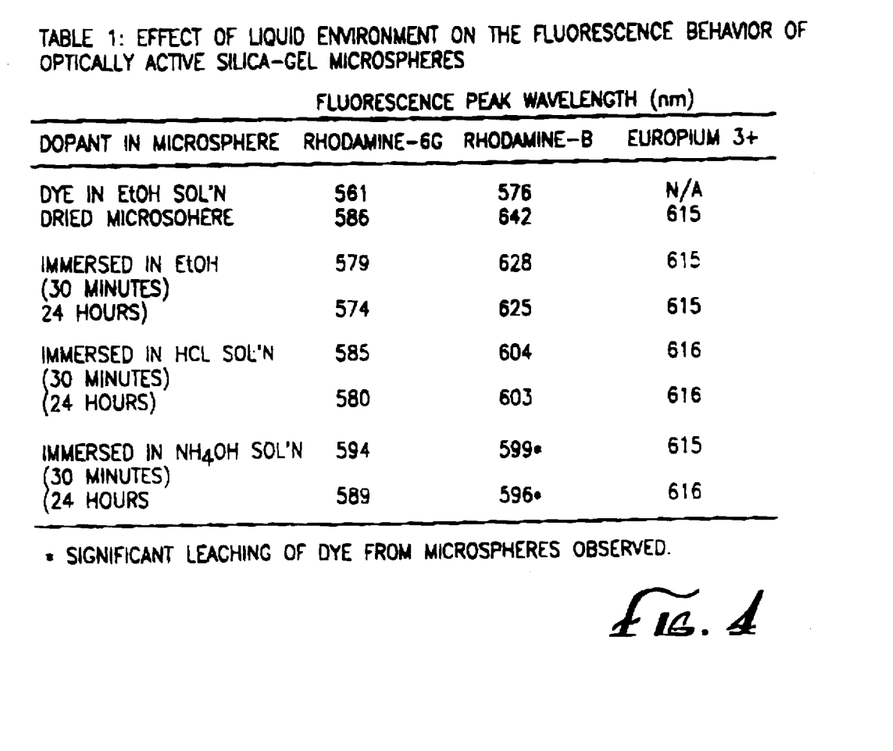
FIG. 4 is a table which sets out the effect of liquid environment on the fluorescence behavior of the optically active silica-gel microsheres which have been synthesized by the process of FIG. 1.

Referring to FIG. 4 a table sets out the effect of a liquid environment on the fluorescence behavior of the optically active silica-gel microsheres 10. This effect allows the optically active silica-gel microsheres 10 to be used as a biological sensing device. When the optically active silica-gel microsheres 10 are immersed in a biological fluid, a fluorescence spectrophotometer is able to measure a shift in the fluorescence peak wavelength.

A biological sensing system includes a container, a plurality of amorphous silica microspheres 10 with fluorescence behavior and a fluorescence spectrophotometer. The container contains a biological fluid to be tested for either the presence or the absence of an organism. The amorphous silica microspheres 10 with fluorescence behavior are placed in the container. A shift in the fluorescence peak wavelength of the dopant in the amorphous silica microspheres 10 occurs if the organism is present. The fluorescence spectrophotometer determine if the shift in the fluorescence peak wavelength of the dopant has occured.

Figure 5:
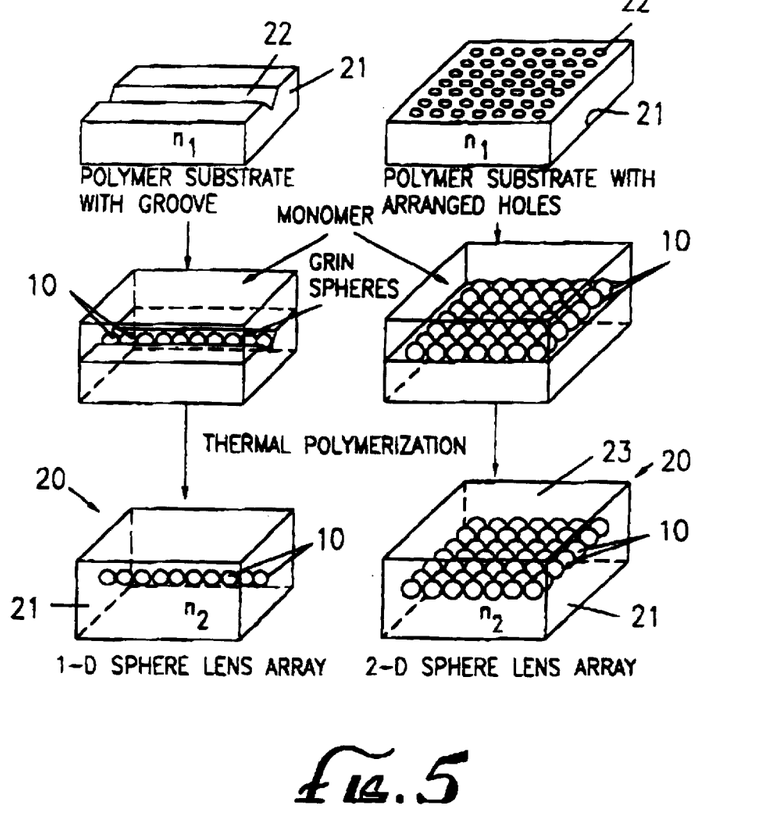
FIG. 5 is a schematic diagram of a process for fabricating a polished array of spherical microlenses according to the present invention.
Figure 6:
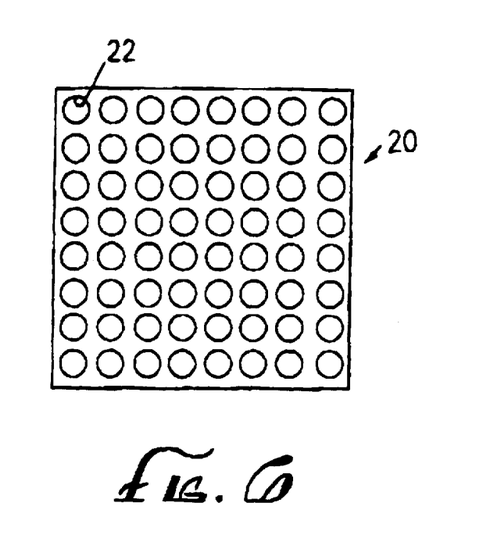
FIG. 6 is a photograph of the polished array of spherical microlenses which has been fabricated by the process for fabricating a polished array of spherical microlenses of FIG. 5.

Referring to FIG. 5 in conjunction with FIG. 6 a process for fabricating a polished array 20 of spherical microlenses includes the steps of forming a plurality of indentions 22 in a plate 21 of a polymer, filling each of the indentations 22 of the plate 21 with one of the amorphous silica microspheres 10.

The process for fabricating the polished array 20 of spherical microlenses also includes immersing the plate 21 into a liquid monomer 23, polymerizing the liquid monomer 23 to encapsulate the amorphous silica microspheres 10 in the plate 21 to form an unpolished array 20 of spherical microlenses and polishing the unpolished array of spherical microlenses. Either ultraviolet light or a catalyst at a curing temperature may be used to polymerize the liquid monomer 23.

A dopant may be selected from a group consisting of rhodamine-6G, rhodamine-B, europium $3^+$, fluorescein, coumarin-120, coumarin-314T, thionin, uranium and uranium-sensitized europium in the process for synthesizing the amorphous silica microspheres 10.

Figure 7:
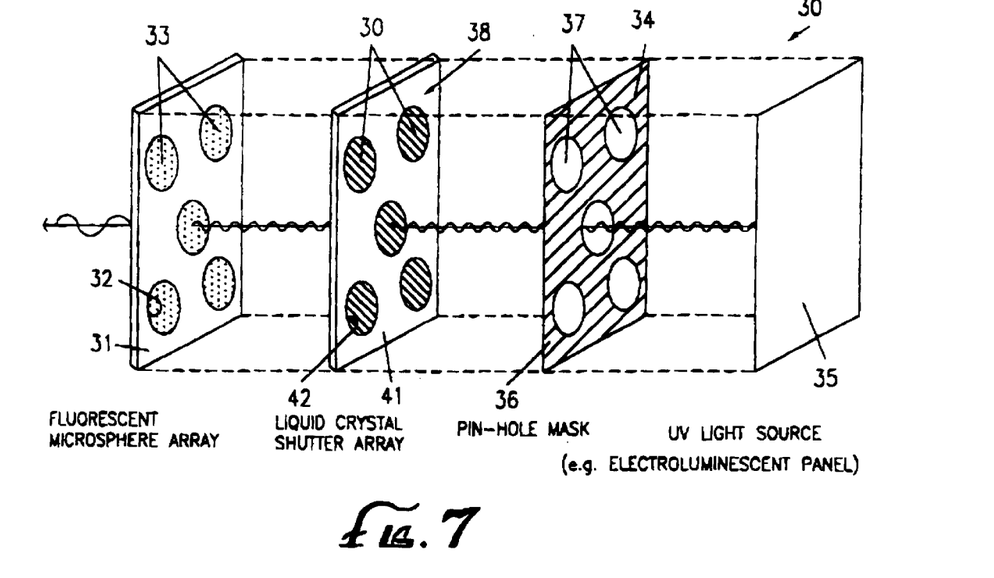
FIG. 7 is an exploded perspective drawing of a display screen which includes a plate, an array of microspheres with fluorescence behavior, a liquid crystal shutter array, a pin hole mask and an ultraviolet light source according to the present invention.
Figures 8, 9:
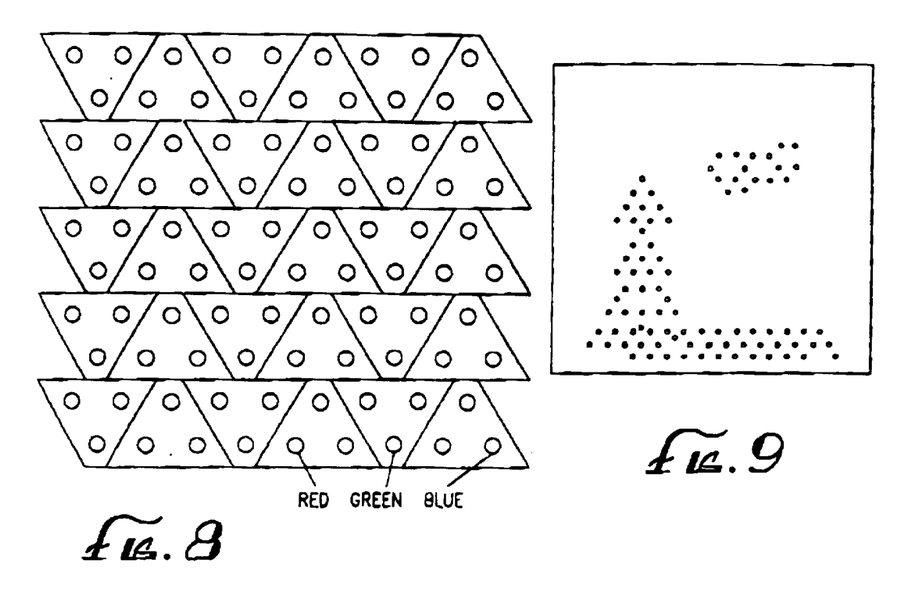
FIG. 8 is a schematic drawing of the distribution of the microspheres with fluorescence behavior of FIG. 7 within in the array thereof.
FIG. 9 is a photograph of the display screen of FIG. 7.

Referring to FIG. 7 in conjunction with FIG. 8 and FIG. 9 a display screen 30 includes a plate 31 which has a plurality of holes 32 arranged in a matrix array, a plurality of microspheres 33, a pin-hole mask 34 and an ultraviolet light source 35. Each microspheres 33 has fluorescence behavior and is disposed in one of the holes 32 in the plate 31. The pin hole-mask 34 is an opaque sheet 36 with a plurality of pin-holes 37 each of which is optically aligned with one of the microspheres 33.

Still referring to FIG. 7 a liquid crystal shutter array 38 includes a plurality of light valves 39. Each light valve 39 is aligned with one of the holes 32 of the plate 31 and one of the pin-holes 37 of the pin-hole mask 34. Each light valve 39 is optically coupled to one of the microspheres 33. The ultraviolet light source 35 is optically coupled to the microspheres 33 through the light valves 39 and the pin-hole mask 34. The light valves 39 are disposed on an opaque plate 41 within an array of pin-holes 42. The presence or an absence of a light path from the ultraviolet light source 35 to any of the associated microspheres 33 determines whether or not it fluoresces. In a display unit which has display electronics each light valves 39 is mechanically coupled to a transparent plate and an opaque sheet with a matrix array of pinholes which are aligned with the liquid crystal shutter array 38 being electrically coupled to the display electronics of the display unit.

Still referring to FIG. 8 in conjunction with FIG. 9 a distribution of the microspheres with fluorescence behavior of different colors, such as red, blue and green, is used to provide a prototype of the display screen.

A photo-luminescent layer or beads applicable to the present assembly may be generated by a process for synthesizing amorphous silica with fluorescence behavior which includes the steps of placing into a container an organosilicon precursor and a highly acidic solution, adding a dopant and stirring the organosilicon precursor and the highly acidic solution to form the organosilicon precursor in the highly acidic solution. Water in the highly acidic solution hydrolizes the organosilicon precursor to form amorphous silica. The highly acidic solution has a molar concentration in the range of 0.05 to 2.5. The organosilicon precursor and the highly acidic solution are immiscible. The volumetric ratio of the organosilicon precursor to the highly acidic solution is in the range from 8 to 1 to 18 to 1. The organosilicon precursor is selected from a group consisting of tetra-ethoxysilane, tetrabutoxysilane, tetramethoxysilane and tetrapropoxysilane. The highly acidic solution is selected from a group consisting of nitric acid and hydrochloric acid. The dopant is selected from a group consisting of rhodamine-6G, rhodamine-B, europium $3^+$, fluorescein, coumarin-120, coumarin-314T, thionin and uranium.

A photo-luminescent layer incorporates silica material with fluorescence behavior. The photo-luminescent layer is produced by a sol-gel process in which a gellable liquid is applied to a substrate to form a thin film, gelled and heated to remove volatile constituents and form a polycrystalline luminescent material.

Figure 10:
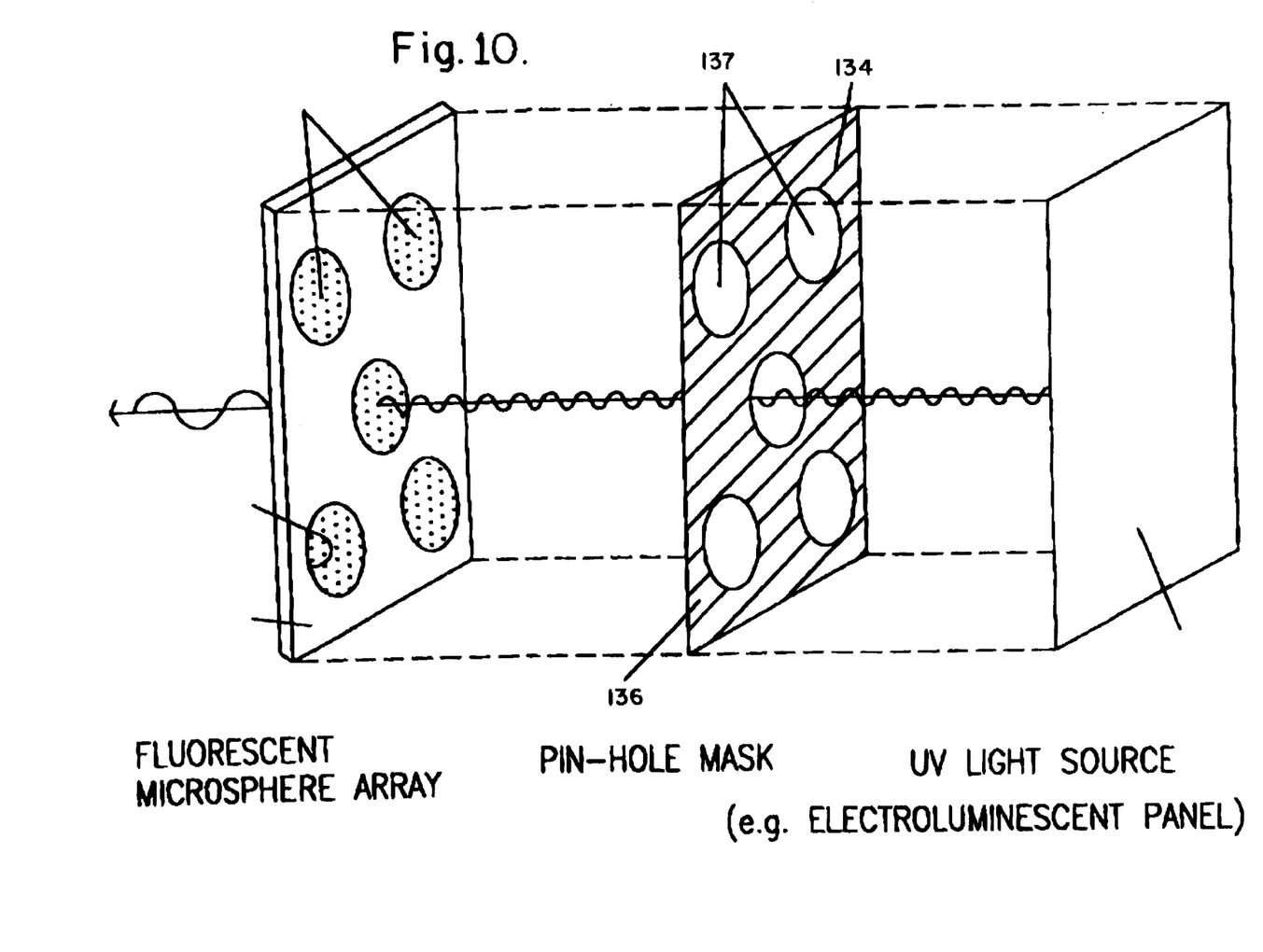
FIG. 10 is an exploded perspective drawing of a display screen which includes a plate, an array of microspheres with fluorescence behavior, a pin hole mask and an ultraviolet light source according to the present invention.

Referring to FIG. 10 a display screen 130 includes a plate 131 which has a plurality of holes 132 arranged in a matrix array, a plurality of microspheres 133, a pin-hole mask 134 and an ultraviolet light source 35. Each microspheres 133 has fluorescence behavior and is disposed in one of the holes 132 in the plate 31. The pin hole-mask 34 is an opaque sheet 136 with a plurality of pin-holes 137 each of which is optically aligned with one of the microspheres 133.

Still referring to FIG. 10, a liquid crystal shutter array 138 includes a plurality of light valves 139. Each light valve 139 is aligned with one of the holes 132 of the plate 131 and one of the pin-holes 137 of the pin-hole mask 134. Each light valve 139 is optically coupled to one of the microspheres 133. The ultraviolet light source 135 is optically coupled to the microspheres 133 through the light valves 139 and the pin-hole mask 134. The light valves 139 are disposed on an opaque plate 141 within an array of pin-holes 142. The presence or an absence of a light path from the ultraviolet light source 135 to any of the associated microspheres 133 determines whether or not it fluoresces. In a display unit which has display electronics each light valves 139 is mechanically coupled to a transparent plate and an opaque sheet with a matrix array of pinholes which are aligned with the liquid crystal shutter array 138 being electrically coupled to the display electronics of the display unit.

Figure 11:
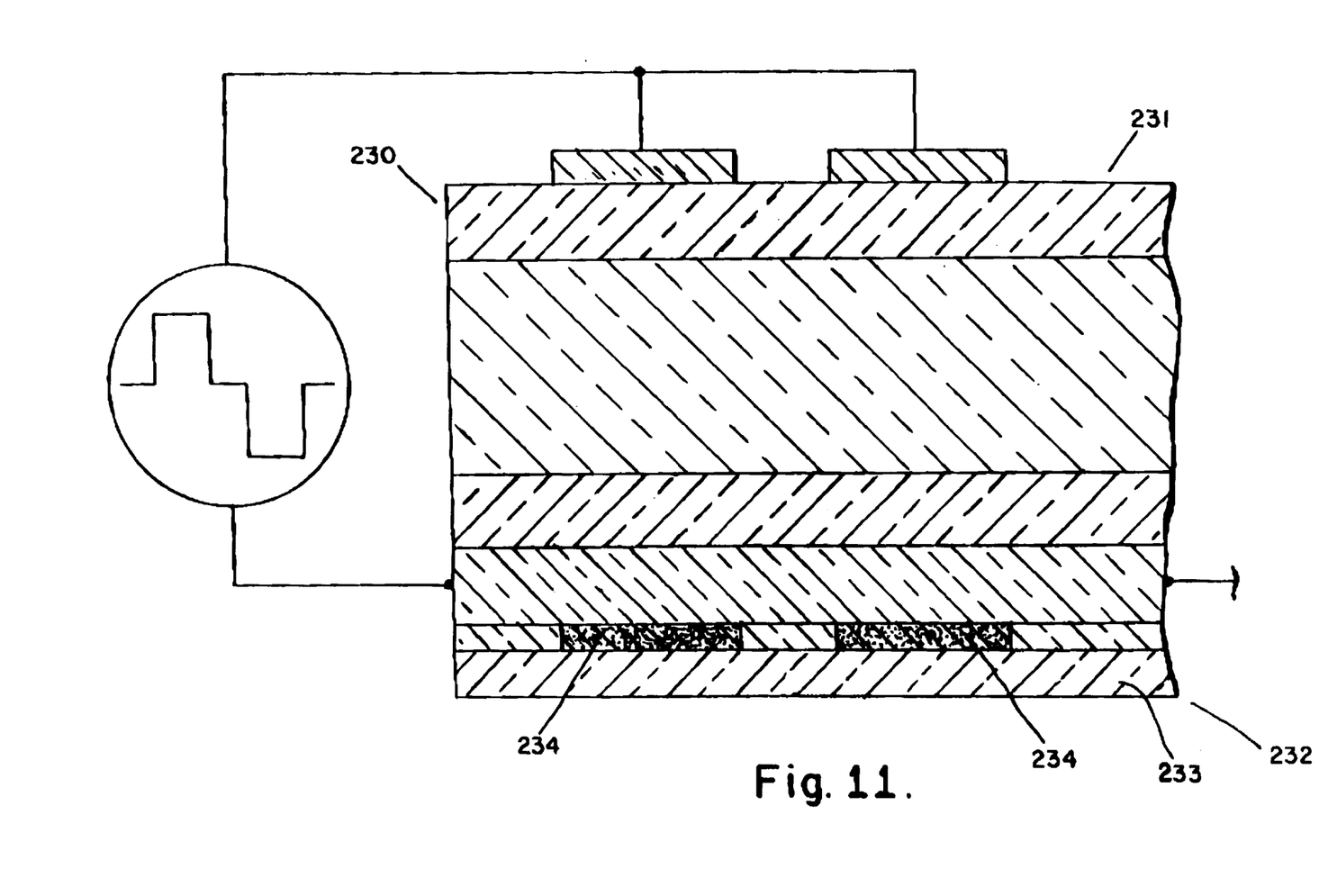
FIG. 11 is an elevation view in cross-section of a photoluminescent/electroluminescent display screen of FIG. 11 according to the present invention.

Referring to FIG. 11, a photo-luminescent/electro-luminescent display screen module 230 includes an electro-luminescent display 231 and a photo-luminescent layer 232. U.S. Pat. No. 5,602,445 teaches the electro-luminescent display 231 which provides an ultraviolet light source. U.S. Pat. No. 5,757,124 teaches the photo-luminescent layer 232 which includes a transparent layer 233 having a plurality of microspheres 234 arranged in a matrix array. Each microspheres 234 has fluorescence behavior.

An electro-luminescent layer includes an alkaline-based halide as a host material and a rare earth as a dopant. The host alkaline chloride can be chosen from the group 11 alkaline elements, particularly strontium chloride or calcium chloride, which, with a europium or cerium rare earth dopant, electro-luminesces at a peak wavelength of 404 and 367 nanometers, respectively. The resulting emissions have CIE chromaticity coordinates which lie at the boundary of the visible range for the human eye thereby allowing a greater range of colors for full color flat panel electroluminescent displays.

Another electro-luminescent layer includes a substrate, a first electrode formed on the substrate, a first insulating layer formed on the first electrode, a phosphorous layer formed on the first insulating layer and having inserted therein one or more intermediate insulating layers, a second insulating layer formed on the phosphorous layer and a second electrode formed on the second insulating layer.

Still another electro-luminescence light-emitting layer generates an optical wavelength and includes a substrate; an indium titanium oxide layer coated on the substrate, at lest two light-emitting layers sequentially formed on the indium titanium oxide layer and having a different band gap, and a metal electrode formed on an upper light-emitting layer of the at least two light-emitting layers. The indium titanium oxide layer is used as an anode and the metal electrode is used as a cathode. Electroluminescent phosphor particles are encapsulated in a very thin silica layer to protect them from aging due to moisture intrusion. A color electroluminescent device which includes a substrate, a first electrode formed on the substrate, a first insulating layer formed on the first electrode, a phosphorous layer formed on the first insulating layer and having inserted therein one or more intermediate insulating layers, a second insulating layer formed on the phosphorous layer and a second electrode formed on the second insulating layer.

Yet another electroluminescent layer includes the sequential lamination of a first electrode, first insulating layer, phosphor layer, second insulating layer and second electrode while using an optically transparent material at least on the side on which light leaves the layer; wherein, in addition to the phosphor layer being composed of calcium thiogallate doped with a luminescent center element. The host of the phosphor layer is strongly oriented to the surface.

Still yet another electro-luminescence light-emitting layer generates an optical wavelength and includes a substrate, an indium titanium oxide (ITO) layer coated on the substrate, at lest two light-emitting layers sequentially formed on the indium titanium oxide layer and having a different band gap, and a metal electrode formed on an upper light-emitting layer of the at least two light-emitting layers. The indium titanium oxide layer is used as an anode and the metal electrode is used as a cathode.

Yet still another inorganic thin film electroluminescent device includes, on an insulating substrate, a back electrode, an insulating layer, a light emission layer, an insulating layer and a transparent electrode formed on the substrate in this order. The emission layer includes a fluoride of an alkaline earth metal and at least one member selected from the group consisting of rare earth element metals and compounds thereof at a mixing ratio by weight of 10:90 to 95:5. The rare earth element may be cerium, praseodymium, neodymium, samarium, europium, gadolinium, terbium, dysprosium, holmium, erbium, thulium, ytterbium and mixture thereof. The compounds may be those compounds of the rare earth elements and fluorine, chlorine, bromine, iodine and oxygen.

Figure 12:
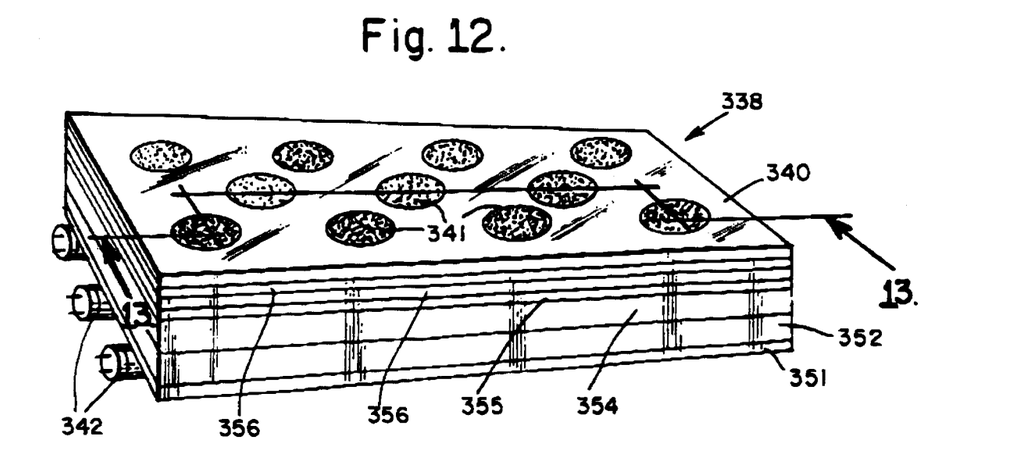
FIG. 12 is a perspective drawing of a photoluminescent display screen according to the present invention.
Figures 13, 14:
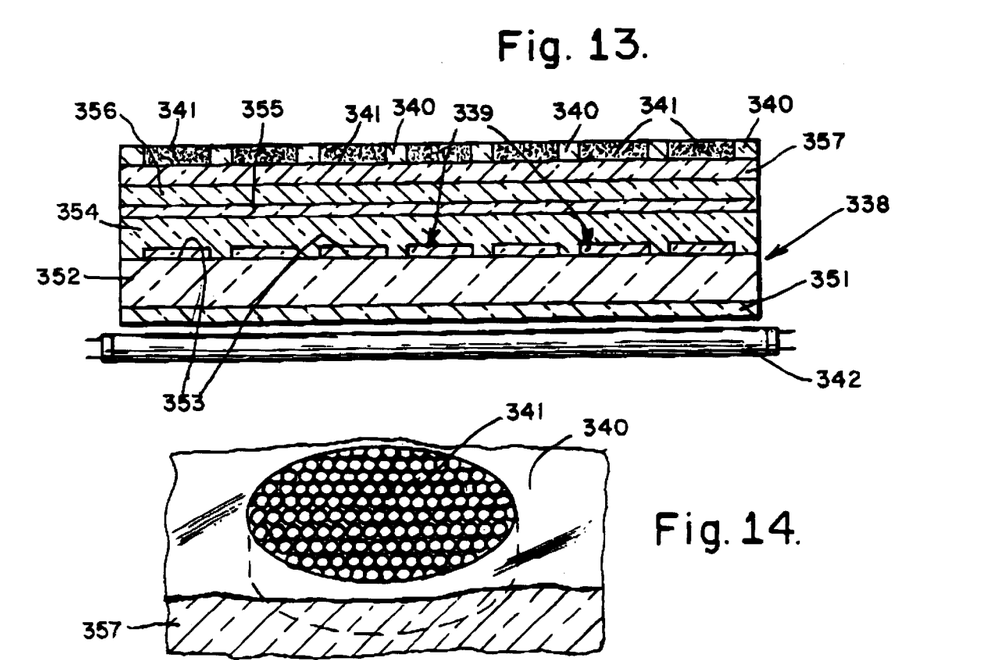
FIG. 13 is an elevation view in cross-section of the photoluminescent display screen of FIG. 11 taken along the line 13—13 of FIG. 12.
FIG. 14 is a partial, enlarged elevation view in cross-section of the photoluminescent display screen of FIG. 11 taken along the line 13—13 of FIG. 12.

Referring to FIGS. 12 through 14, the photo-luminescent display screen 310 includes a liquid crystal shutter array 338 which includes a plurality of liquid crystal light valves 339 and a set 340 of microspheres 341 which arranged in a matrix array. The liquid crystal light valves 339 is aligned with the set 340 of microspheres 341 with each liquid crystal light valve 339 being optically coupled to one of the microspheres 341. An ultraviolet light source 342 is optically coupled to the microspheres 341 through the light valves 339. The presence or an absence of a light path from the ultraviolet light source 342 to any of the associated microspheres 341 determines whether or not they fluoresce. In a display unit which has display electronics, each liquid crystal light valve 339 includes a first polarizer layer 351, a first transparent glass substrate 352, a set of transparent electrodes 353 which are formed by indium titanium, a liquid crystal layer 354, a common transparent electrode 355 which are formed by indium titanium oxide, a second polarizer layer 356, a second transparent glass substrate 357 which has the set 340 of the microspheres 341 with the liquid crystal shutter array 338 being electrically coupled to the display electronics of the display unit.

From the foregoing it can be seen that a photoluminescent/electroluminescent display screen which incorporates silica material with fluorescence behavior has been described. It should be noted that the sketches are not drawn to scale and that distance of and between the figures are not to be considered significant. Accordingly it is intended that the foregoing disclosure and showing made in the drawing shall be considered only as an illustration of the principle of the present invention.

What is claimed is:

1. A photo-luminescent/electro-luminescent display screen comprising:
   a. an electro-luminescent layer; and
   b. a photo-luminescent layer optically coupled to the electro-luminescent layer and including a transparent layer coated with an amorphous silica with fluorescence behavior.

2. The screen of claim 1 further comprising a plurality of liquid crystal light valves optically coupled to the electroluminescent layer, each of the liquid crystal light valves including a first polarizer layer, a first transparent glass substrate, a set of transparent electrodes which are formed by indium titanium oxide, a liquid crystal layer, a common transparent electrode formed by indium titantium oxide and a second polarizer layer.

3. A photo-luminescent/electro-luminescent screen according to claim 2 including a source of ultravioloet light energy wherein said source of ultraviolet light energy is a patterned array of discretely addressable pixels of ultraviolet light energy.

4. A photo-luminescent screen according to claim 1 including a layer of fluorescent phosphor wherein said layer of fluorescent phosphor has a patterned array of fluorescent phosphor pixels.

5. A photo-luminescent/electro-luminescent screen according to claim 3 wherein said source of ultraviolet light energy is an electro-luminescent light source.

6. An electro-photoluminescent screen according to claim 4 wherein each of said discretely addressable pixels of ultraviolet light energy is optically coupled to one of said fluorescent phosphor pixels.

7. An photo-luminescent screen according to claim 1 in which said layer of fluorescent phosphors and said source of ultraviolet light energy are deposited upon a substrate.

8. A photo-luminescent/electro-luminescent screen according to claim 1 in which said layer of fluorescent phosphors and said source of ultraviolet light energy are deposited upon a substrate.

9. A photo-luminescent/electro-luminescent screen according to claim 2 in which said layer of fluorescent phosphors and said source of ultraviolet light energy are deposited upon a substrate.

10. An luminescent/electroluminescent screen according to claim 3 in which said layer of fluorescent phosphors and said source of ultraviolet light energy are deposited upon a substrate.

11. A photo-luminescent/electro-luminescent screen according to claim 6 in which said layer of fluorescent phosphors and said source of ultraviolet light energy are deposited upon a substrate.

* * * * *